(12) United States Patent
Kiliany, Jr. et al.

(10) Patent No.: US 11,298,672 B2
(45) Date of Patent: Apr. 12, 2022

(54) REACTOR HEATING TO ACHIEVE MINIMUM PRESSURIZATION TEMPERATURE

(71) Applicant: ExxonMobil Research and Engineering Company, Annandale, NJ (US)

(72) Inventors: Thomas R. Kiliany, Jr., Spring, TX (US); Suriyanarayanan Rajagopalan, Spring, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 133 days.

(21) Appl. No.: 16/996,999

(22) Filed: Aug. 19, 2020

(65) Prior Publication Data

US 2021/0113985 A1 Apr. 22, 2021

Related U.S. Application Data

(60) Provisional application No. 62/915,710, filed on Oct. 16, 2019.

(51) Int. Cl.
*B01J 8/02* (2006.01)
*B01J 19/00* (2006.01)
(Continued)

(52) U.S. Cl.
CPC .......... *B01J 19/0013* (2013.01); *C10G 47/36* (2013.01); *C10G 2300/4031* (2013.01)

(58) Field of Classification Search
CPC ..... B01J 8/00; B01J 8/02; B01J 8/0285; B01J 19/00; B01J 19/0006; B01J 19/0013;
(Continued)

(56) References Cited

U.S. PATENT DOCUMENTS 3,725,320 A * 4/1973 Wang ......................... C08J 9/22
521/146
3,927,983 A * 12/1975 Gordon .................... B01J 19/18
422/135

(Continued)

OTHER PUBLICATIONS

McLaughlin, "Establishing Minimum Pressurization Temperature (MPT) for Heavy-Wall Reactors in Hydroprocessing Units", Proceedings of PVP2006-ICPVT-11, 2006, ASME Pressure Vessels and Piping Division Conference, Jul. 23-27, Vancouver, Canada.

*Primary Examiner* — Natasha E Young
(74) *Attorney, Agent, or Firm* — Robert A. Migliorini

(57) ABSTRACT

Systems and methods are provided for performing the initial heating phase for a thick wall reactor, such as a hydroprocessing reactor, by using heat tracing to heat the exterior walls of the reactor. Instead of attempting to initially heat the reactor by passing a low pressure heat transfer gas through the interior of the reactor, external heater(s) placed under the reactor insulation can be used to heat the exterior of the reactor. An example of a suitable external heater is a heat tracing blanket, where heat is provided by passing steam through pipes in contact with the external surface or by electrical heaters in contact with the external surface. This can allow for more rapid heating of the reactor, so that a target temperature can be achieved in a time of 5.0 hours or less.

20 Claims, 2 Drawing Sheets

(51) Int. Cl.
  *B01J 19/24* (2006.01)
  *C10G 47/36* (2006.01)
(58) Field of Classification Search
  CPC .................. B01J 19/24; B01J 2208/00; B01J
    2208/00008; B01J 2208/00017; B01J
    2208/00106; B01J 2208/00168; B01J
    2208/00194; B01J 2208/00389; B01J
    2208/00407; B01J 2208/00415; B01J
    2208/00716; B01J 2219/00; B01J
    2219/24; C10G 47/00; C10G 47/36;
    C10G 2300/00; C10G 2300/40; C10G
    2300/4031
  See application file for complete search history.

(56) References Cited

U.S. PATENT DOCUMENTS

2007/0254968 A1* 11/2007 Agee .................. C10G 2/33
  518/726
2018/0163996 A1* 6/2018 McIntyre ................ F24S 60/00

\* cited by examiner

REACTOR HEATING TO ACHIEVE MINIMUM PRESSURIZATION TEMPERATURE

CROSS-REFERENCE TO RELATED APPLICATIONS

This application claims the benefit of priority from U.S. Provisional Application No. 62/915,710 filed Oct. 16, 2019, which is herein incorporated by reference in its entirety.

FIELD OF THE INVENTION

Systems and methods are provided for starting up refinery processing units that are operated at elevated temperature and pressure.

BACKGROUND OF THE INVENTION

Various processes for petroleum refining and/or chemicals production involve exposing a feedstock under reaction conditions including elevated temperatures and/or pressures. These processes are typically performed in reactor vessels with thick reactor walls composed of a steel alloy. However, shutting down and restarting of the processes is occasionally required. This can be due to reactor maintenance, shut down of a related process, or various other reasons.

In some refinery processes, processing of a feedstock in a reactor vessel also involves exposing the feedstock to a partial pressure of $H_2$. Examples of such processes include various types of hydroprocessing, such as hydrotreating, hydrocracking, catalytic dewaxing, and aromatic saturation processes. Although hydroprocessing is a conventional technology, the reactors within a given refinery that are used for processing a feed in the presence of $H_2$ at elevated temperature, elevated pressure correspond to a limited subset of the total number of reaction vessels.

Generally, the reaction vessels in a refinery that operate under conditions of elevated temperature and pressure can continue for extended periods, regardless of whether hydrogen is present in the reaction environment. However, when the combination of hydrogen, elevated temperature, and elevated pressure is present within a reaction vessel, the reaction vessel can be susceptible to degradation. In particular, the materials used for construction of the reactor vessels can undergo temperature embrittlement, which is an upward shift in the ductile-to-brittle transition temperature. Such temperature embrittlement does not impact the steady state operation of the reaction vessel. However, the temperature embrittlement can increase the ductile-to-brittle transition temperature by 100° C. or more. As a result, when starting up the reaction vessel after a shutdown, the reactor vessel may not have sufficient strength to contain the maximum operating pressure for the vessel while at temperatures below 100° C.

In order to avoid the potential for structural failure, conventional methods for restarting a reactor used for hydroprocessing involve limiting the pressure within the reactor until the temperature is greater than the ductile-to-brittle transition temperature after temperature embrittlement, such as greater than a temperature of roughly 100° C. Instead, the pressure inside the vessel is maintained at pressures of 250 psig (~1.7 MPa-g) or less. While this is effective for avoiding the risk of reactor wall failure, it substantially increases the amount of time required to start the reactor. An example of how to determine a minimum pressurization temperature for a reactor is described in a conference presentation titled "Establishing Minimum Pressurization Temperature (MPT) for Heavy-Wall Reactors in Hydroprocessing Units" (James E. McLaughlin, Proceedings of PVP2006-ICPVT-11, 2006, ASME Pressure Vessels and Piping Division Conference, July 23-27, Vancouver, Canada.)

Reactors are typically heated by passing a heated gas flow through the reactor. For reactors that are not exposed to a combination of hydrogen, elevated pressure, and elevated temperature during processing, the pressure during the heating phase can be similar to the operating pressure or even a higher pressure. This can allow heating with a heated gas flow to be relatively efficient for many reaction vessels within a refinery or chemical production setting. However, addition of heat tracing, along with additional insulation to cover the heat tracing, can require substantial initial cost when constructing a reactor.

Hydroprocessing reactors are an example of a reactor where the interior reactor surfaces are exposed to hydrogen gas while at elevated pressure and temperature. When such reactors are restarted, only limited pressure is permitted within the reactor until a minimum pressurization temperature is achieved. For such reactors, due to the relatively low pressure and the large mass of the reactor walls, increasing the temperature from an ambient temperature of roughly 20° C. to 100° C. can take 24 hours or more. This represents loss of a full day or more of reactor operating time, corresponding to a substantial loss of productivity during reach reactor re-start event.

What is needed is a more efficient method for heating a reactor to the minimum pressurization temperature.

SUMMARY OF THE INVENTION

In an aspect, a method for starting up a reactor is provided. The method can be suitable for starting up a reactor that is used for exposing a feedstock to hydrogen under elevated temperature and pressure conditions. The method can include heating a reactor wall of a reactor from an initial temperature of less than 70° C. to a first temperature of 95° C. or more. The heating can be accomplished by heating an external wall surface of the reactor wall using heat tracing. During the heating of the external wall surface, a pressure in the reactor can be 2.0 MPa-g or less during the heating. After the heating, a pressurizing gas flow can be passed into the reactor to increase the pressure in the reactor by 0.5 MPa or more and/or to increase the pressure in the reactor to 2.0 MPa-g or more. Additionally, after the heating, a heated gas flow can be passed into the reactor to increase the temperature of the reactor wall by 50° C. or more relative to the first temperature and/or to increase the temperature of the reactor wall to 200° C. or more.

DETAILED DESCRIPTION

Figure 1:
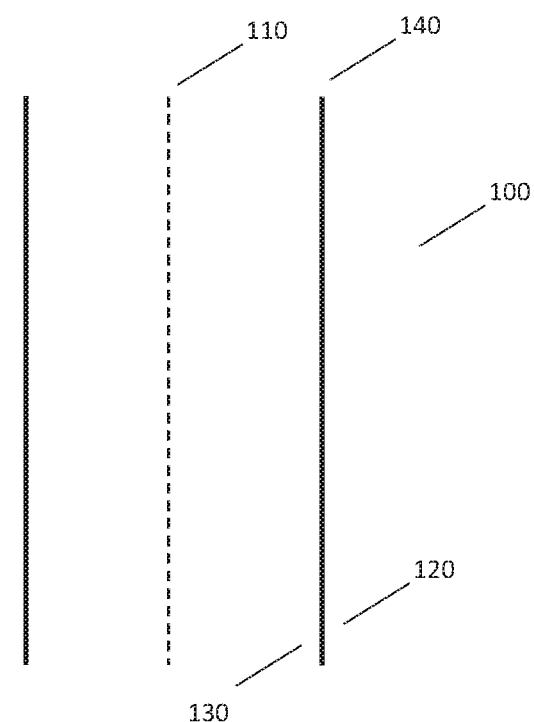
FIG. 1 illustrates the application of the Laplace equation to a cylindrical reactor for determining the time to achieve a desired temperature for the reactor walls.

All numerical values within the detailed description and the claims herein are modified by "about" or "approximately" the indicated value, and take into account experimental error and variations that would be expected by a person having ordinary skill in the art.

In various aspects, systems and methods are provided for performing the initial heating phase for a thick wall reactor, such as a hydroprocessing reactor, by using heat tracing to heat the exterior walls of the reactor. Instead of attempting to initially heat the reactor by passing a low pressure heat transfer gas through the interior of the reactor, external heater(s) placed under the reactor insulation can be used to heat the exterior of the reactor. An example of a suitable external heater is a heat tracing blanket, where heat is provided by passing steam through pipes in contact with the external surface or by electrical heaters in contact with the external surface. This can allow for more rapid heating of the reactor, so that a minimum pressurization temperature (or another target temperature) can be achieved in a time of 5.0 hours or less, or 2.5 hours or less. This is in contrast to the 24 hours or more that can be required for heating a commercial scale reactor to a minimum pressurization temperature when using a low pressure gas flow as the heat transfer medium. For large volume commercial scale reactors (e.g., ~50,000 barrels per day or more) producing products such as diesel fuel, lubricants, or other high value products, each day of reactor operating time can correspond to production of millions of dollars of product, so reducing down time by even a single day during startup corresponds to a substantial increase in value.

The amount of insulation included on a thick wall reactor can be selected based on a variety of considerations, including some economic considerations. Providing greater amounts of insulation for a reactor can increase capital costs for constructing the reactor, but operational costs can be reduced. In some aspects, the insulation on the exterior of the reactor can correspond to full insulation of the reactor. In other aspects, some type of partial insulation of the reactor can be used. When partial insulation is used, the amount of insulation on the reactor can correspond to 75% or less of the reactor wall surface area, or 50% or less, or 33% or less. For example, the insulation can cover 15% to 100% of the exterior reactor wall surface, or 15% to 75%, or 15% to 50%, or 15% to 33%. At least a portion of the heat tracing for the reactor can be included in the area of the exterior reactor wall that is covered by insulation.

Commercial scale reactors for performing processes at elevated pressures typically have reactor wall thicknesses of 2.5 cm (~1.0 inch) or more, or 10 cm (~4.0 inches) or more, or 15 cm (~6.0 inches) or more, such as up to 35 cm (~14 inches) or possibly still higher. This is in contrast to pilot scale reactors, where the reactor walls are less than 1.25 cm (~0.5 inches) thick. Conventionally, all thick wall reactors in a refinery or chemical plant setting are heated by passing heated gas flows into the reactor. This has the advantage of allowing an external temperature sensor to be used to determine the reactor wall temperature, as the interior surface of the reactor will be at least as hot as the exterior surface.

For the majority of reactors where the interior surfaces of the reactor walls are not exposed to a combination of elevated temperature, elevated pressure, and a partial pressure of $H_2$, any convenient pressure can be used during the initial heating phase of a reactor. However, for reactors such as hydroprocessing reactors, the pressure during the initial heating phase is limited, so that the heating gas flow corresponds to a low pressure flow. While this is effective for heating internal structures, the relative surface area of the reactor walls is limited relative to the volume of the reactor walls. In combination with the limited pressure that can be used prior to achieving a minimum pressurization temperature, the rate of heat transfer from an internal gas flow to the reactor walls is limited. Additionally, since the catalyst is loaded into the reactor prior to heating, the catalyst in the reactor is an additional heat sink that can limit the rate of reactor heating. Thus, a variety of factors can limit the rate of heating for a thick wall reactor via a low pressure gas flow.

In contrast to the above conventional method for heating a thick wall reactor, in various aspects, a thick wall reactor that is used for performing processing at elevated temperature, elevated pressure, and in the presence of a partial pressure of $H_2$, can be heated to a desired temperature (e.g., a minimum pressurization temperature) using heat tracing on the exterior of the reactor. After the initial desired temperature is achieved so that the pressure in the reactor can be increased, further heating of the reactor walls can be performed using internal gas flows. Using a combination of heat tracing for the initial heating of a reactor in combination with internal gas phase heat transfer to continue heating can allow for more rapid heating of a reactor at low temperature while still retaining the benefits of internal gas phase heating at higher temperatures. It is noted that an internal gas flow could also be used to further assist heating in the low temperature range prior to reaching a desired initial temperature (such as a desired minimum pressurization temperature). Additionally, it is noted that heating of the reactor wall occurs preferentially relative to heating of the catalyst, so that the time period required to reach a target temperature for the reactor wall is further minimized.

The heat tracing can be used to heat the exterior wall of the reactor to a heating temperature. The heating temperature for the exterior wall surface can be greater than the target temperature for the interior wall surface by 10° C. to 50° C. (roughly 20° F. to 90° F.), or 10° C. to 30° C. In various aspects, the heating temperature for the exterior wall surface can be between 105° C.-205° C. (roughly 220° F. to 400° F.), or 105° C.-180° C., or 115° C.-205° C., or 115° C.-180° C., or 105° C.-160° C. The target temperature for the interior wall surface can be selected, for example, to be equal to or greater than a minimum pressurization temperature for the reactor. In various aspects, the target temperature can be 95° C.-150° C. (roughly 200° F. to 300° F.), or 95° C.-130° C., or 100° C.-150° C., or 100° C.-130° C. Depending on the aspect, a target temperature can be selected for the interior wall surface, the center of the reactor, or any other convenient second location within the reactor. The time to reach the target temperature can depend on the thickness of the reactor walls. In some aspects, the time to reach the target temperature can be 0.5 hours to 5.0 hours, or 1.0 hours to 10 hours, or 1.0 hours to 5.0 hours. During the time period prior to reaching the target temperature, the pressure in the reactor can be maintained at a pressure of 300 psig or less (~2.0 MPa-g or less), or 250 psig or less (~1.7 MPa-g or less), or 200 psig or less (~1.4 MPa-g or less), such as down to ambient pressure (roughly 0 gauge pressure). If desired, the heating to the target temperature can be performed prior to performing any pressure increase inside the reactor, since the internal pressure of the reactor has only a minimal impact on the heating rate of the reactor walls when using heat tracing as the method of heating.

After heating the reactor wall for a sufficient time to allow the interior surface of the reactor wall to reach the target temperature, the pressure in the reactor can be increased. This can correspond to an increase of 0.5 MPa or more, or 2.0 MPa or more, or 5.0 MPa or more, such as up to an increase of 20 MPa or possibly still more. Additionally, the temperature of the reactor can be increased using an internal gas flow. The temperature increase during and/or after the pressure increase can be a temperature increase of 50° C. or more, or 100° C. or more, or 200° C. or more, such as up to 500° C. or possibly still higher.

FIG. 1 illustrates an example of a reactor, and the relevant features for applying the Laplace equation for a given location of reactor wall to reach a target temperature based on heating of the external surface of the reactor wall. In FIG. 1, a portion of a reactor 100 is shown. It is understood that the portion of the reactor 100 represents a portion of a cylinder, which is a typical shape for a reactor. The dotted line corresponds to the central axis 110 of the cylinder corresponding to the reactor. The central axis 110 corresponds to r=0 for the cylinder. Wall 140 of the reactor 100 includes an exterior surface 120 and an interior surface 130. The exterior surface 120 is at a distance $r=R_{EX}$ from the central axis 110. The interior surface 130 is at a distance $r=R_{IN}$ from the central axis 110.

The time needed to heat an interior location of the reactor and/or the interior wall surface to the target temperature (such as the minimum pressurization temperature) can be determined using the heat-equation in cylindrical coordinates. Equation (1) shows the application of the heat-equation to thermal conductivity.

$$\frac{\partial T}{\partial t} = \alpha \nabla^2 T \quad (1)$$

In Equation (1), $\alpha$ is the thermal diffusivity and $\nabla^2$ is the Laplace operator. The thermal diffusivity is defined in Equation (2).

$$\alpha = \frac{k}{\rho C_p} \quad (2)$$

In Equation (2), k is the thermal conductivity, $\rho$ is the density, and $C_p$ is the specific heat capacity of the material the reactor is made of.

Equation (1) has an analytical solution that is dependent on the boundary conditions. For determining the heating of a reactor well, two boundary conditions are needed along with an initial condition. The initial condition can correspond to the initial internal temperature of the reactor, which is roughly 20° C. One of the boundary conditions is set by the temperature of the external reactor wall (where $r=R_{EX}$), which is set by the heating blanket. As noted above, this temperature can range from 105° C. to 160° C. The other boundary condition can be set as a no-heat-flux boundary condition at r=0. This boundary condition treats the cylinder as a solid metal cylinder as opposed to an annulus, but this should have at most a minimal impact on the determination of the wall temperature. The no-heat-flux boundary condition can be expressed as Equation (3).

$$\frac{\partial T}{\partial r} = 0 \text{ at } r = 0 \quad (3)$$

Based on the above initial condition and boundary conditions, the equation can be solved to determine the temperature at a given value of r (such as $R_{IN}$). One well known way of expressing the solution is based on using a dimensionless radius value of r/R and a dimensionless temperature value of $(T-T_0)/(T_1-T_0)$, where r is the radial position variable, R is total radius of the cylindrical reactor, T is the temperature variable, $T_0$ is the initial temperature, and $T_1$ is the temperature provided by the heat tracing to the external wall surface.

Figure 2:
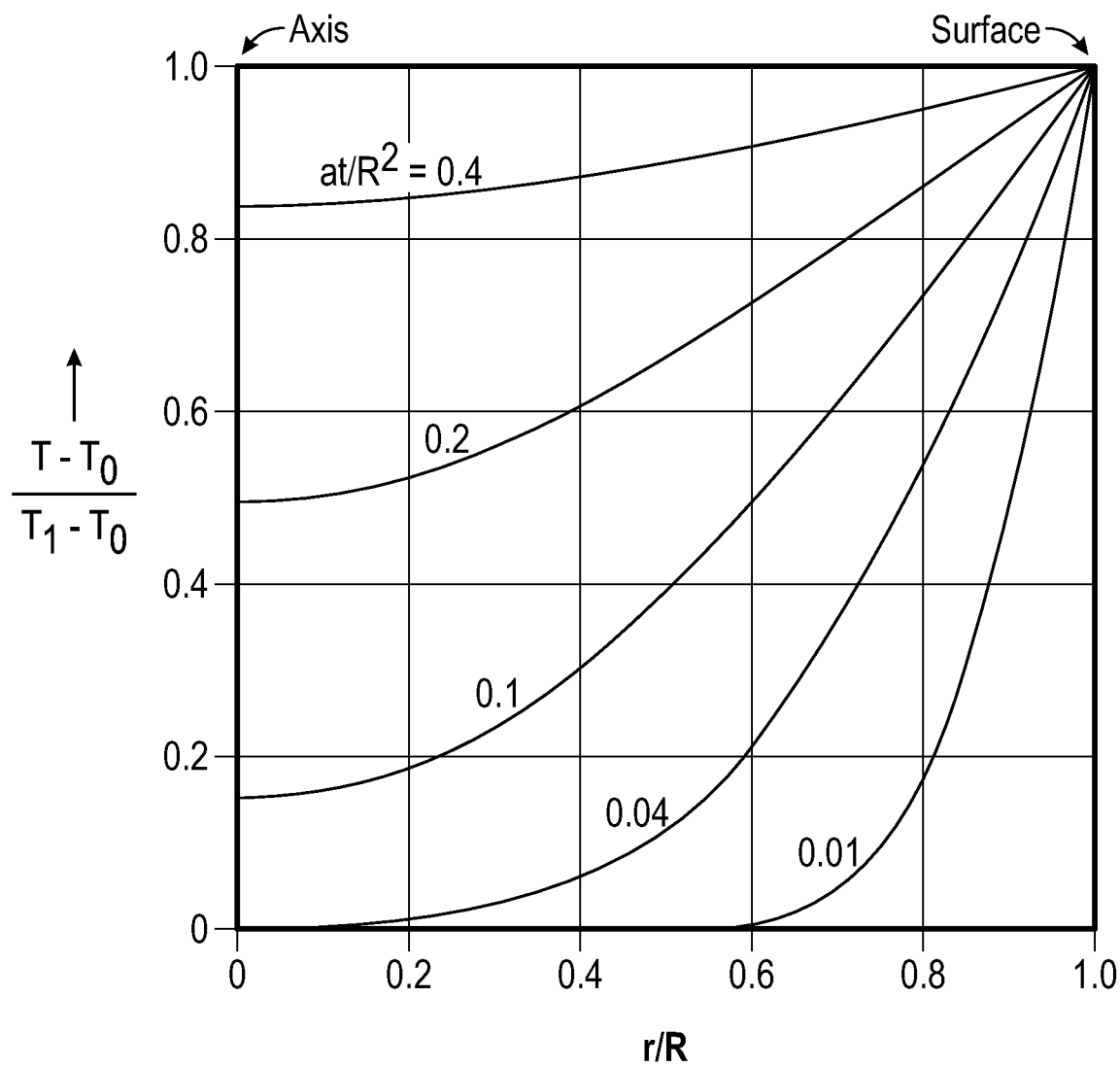
FIG. 2 shows a family of solutions to the heat-equation.

FIG. 2 shows examples of a family of solutions for Equation (1) for various values of $\alpha_t/R^2$. In FIG. 2, a curve corresponding to the appropriate solution can be selected by finding the curve that is closest to the values of the dimensionless radius and the dimensionless temperature on the axes. Once a curve is selected, the time for a given location to reach a desired temperature can be calculated.

As an example, a hydroprocessing process can be designed to operate at a temperature of roughly 840° F. (~450° C.) and a pressure of roughly 1275 psig (~8.8 MPa-g). A suitable reactor for such a process can have a vessel diameter of 4.87 meters, with a reactor wall thickness of 6 inches (~0.15 meters). This means that the radius "R" to the outer surface of the reactor wall is 4.87/2=2.435 meters. The radius "r" to the inner surface of the reactor wall is (4.87−0.15)/2=2.36 meters. For a reactor with the above physical specifications, r/R turns out to be (4.87/2−0.1524)/(4.87/2)~0.9. For this type of reactor, an example of a target temperature for initial heating can be to reach a temperature of roughly 200° F. (~93° C.). To achieve this target temperature, heat tracing can be used to heat the exterior wall at 250° F. The initial value of $T_0$ can be set to a typical ambient temperature, such as 70° F. (~20° C.). Based on the outer wall heating temperature and the target interior wall temperature, $(T-T_0)/(T_1-T_0)$ is given as (200−70)/(250−70) =0.72. (In degrees Celsius, the calculation is (93−20)/(121− 20)=0.72.)

The above coordinates of 0.72 for the dimensionless temperature and 0.9 for the dimensionless radius correspond to a location in FIG. 2 that approximately resides on the curve for $\alpha_t/R^2$=0.01. Thus, a value of 0.01 for $\alpha_t/R^2$ will fit the purpose for estimating the time for the interior of the 6" vessel to reach 200° F. The following typical values for chrome-moly stainless steel, a suitable material for a steel reactor wall, are available: Thermal Conductivity=25 W/(m*K); Density=7,730 kg/m$^3$; Heat Capacity=456 J/(kg*K).

Based on the above values, the thermal diffusivity can be calculated as $$\alpha = 25 \text{ (J/s/(m*K))}/[(7,730) \text{ kg/m}^3 * 456 \text{ J/(kg*K)}] = 7 \times 10^{-6} \text{ m}^2/\text{s} \quad (4)$$

Based on a value of $\alpha$ of $7 \times 10^{-6}$ m$^2$/s, the time to reach a desired temperature for the interior surface of the reactor can be calculated based on $(7 \times 10^{-6} \text{ m}^2/\text{s})*t/(4.87/2)=0.01$. Solving for t, the resulting value is roughly 2 hours. This illustrates that using heat tracing to heat the exterior wall of a reactor can provide a substantial time savings relative to the time required for heating a reactor using a low pressure gas flow.

After heating the reactor wall to a target temperature, the pressure within the reactor can be increased to allow for further heating to reach a desired operating condition. One example of a reactor that can be heated to a minimum pressurization temperature using the methods described herein is a hydroprocessing reactor. During hydroprocessing, a feedstock is exposed to hydrogen in the presence of a catalyst at elevated temperature and pressure. In various aspects, when starting up a hydroprocessing reactor, heat tracing on the external reactor wall can be used to heat the reactor wall to a target temperature, such as a temperature of between 95° C. and 150° C. After reaching the target temperature, further heating can be performed using a pressurized gas flow.

In some aspects, after reaching the target temperature, the reactor may be operated at a relatively low pressure, such as a pressure of 300 psig or less (~2.0 MPa-g). In such aspects, any additional heating may be performed using the internal gas flow, but the pressure may be substantially similar to the pressure during the heating using the heat tracing. In other aspects, the operating pressure for the reactor can be substantially greater than the pressure during the initial heating. In such aspects, additional heating of the reactor can be performed during and/or after increasing the pressure in the reactor by using pressurized gas inside the reactor.

It is noted that during such additional heating, the heat tracing can be inactive. For example, if a controller is used for the heat tracing to maintain an external wall temperature of no greater than 160° C., then after the reactor wall temperature is greater than 160° C., the controller will turn off the heat tracing.

Hydroprocessing of a petroleum feed is an example of a process that can be performed in a reactor. During hydroprocessing, a feedstock is exposed to a catalyst in the presence of hydrogen gas at elevated temperature and pressure. When a hydroprocessing reactor is restarted, an initial heating phase can be performed using heat tracing to raise the temperature of the reactor to 95° C.-150° C. while maintaining a pressure of 2.0 MPa-g or less. Typical hydroprocessing conditions can include a reactor pressure of 300 psig (2.0 MPa-g) to 3000 psig (20.7 MPa-g), or 500 psig (3.4 MPa-g) to 3000 psig (20.7 MPa-g), or 1000 psig (6.9 MPa-g) to 3000 psig (20.7 MPa-g); and an internal temperature of 250° C. to 450° C., or 260° C. to 450° C. In aspects where the hydroprocessing will be performed at a pressure of 2.0 MPa-g or more, The increase in temperature from 95° C.-150° C. can be performed during the increase in pressure from 2.0 MPa-g or less to 2.0 MPa-g or more; or after the increase in pressure to 2.0 MPa-g or more; or a combination thereof.

EXAMPLE OF REACTOR HEATING

As an example, a hydroprocessing process can be designed to operate at a temperature of 840° F. (~450° C.) and a pressure of 1275 psig (~8.8 MPa-g). A suitable reactor for such a process can have a vessel diameter of 4.87 meters, with a reactor wall thickness of 6 inches (~0.15 meters). This means that the radius to the outer surface of the reactor wall is 4.87/2=2.435 meters. The radius to the inner surface of the reactor wall is (4.87−0.15)/2=2.36 meters.

When restarting the reactor, the pressure can initially be maintained at a pressure of 250 psig (1.7 MPa-g) or less. Heat tracing on the external wall surface of the reactor can then be used to heat the reactor wall to a target temperature, such as a temperature of 100° C. After reaching 100° C., the pressure in the reactor can be increased to 8.8 MPa-g. During and/or after increasing the pressure to 8.8 MPa-g, further heating of the reactor can be performed using an internal heated gas flow to reach the desired operating temperature of 450° C.

By using heat tracing to perform the initial heating, the initial heating period can be reduced from roughly 24 hours to roughly 2 hours. This corresponds to saving roughly a day of operating time for each restart of the reactor. For a commercial scale diesel fuel hydroprocessing reactor, the value for each day of operation (based on the diesel fuel produced) is on the order of millions of dollars per day. This benefit of additional operating time can be realized for each restart of a reactor. Thus, for a reactor with a 20 year life span and scheduled shut downs ever 4 years, the benefit of additional operating time can be realized 4 times or more during the life of the reactor.

ADDITIONAL EMBODIMENTS

Embodiment 1. A method for starting up a reactor, comprising: heating a reactor wall of a reactor from an initial temperature of less than 70° C. to a first temperature of 95° C. or more by heating an external wall surface of the reactor wall using heat tracing, a pressure in the reactor being 2.0 MPa-g or less during the heating; passing a pressurizing gas flow into the reactor to increase the pressure in the reactor by 0.5 MPa or more; and passing a heated gas flow into the reactor to increase the temperature of the reactor wall by 50° C. or more relative to the first temperature.

Embodiment 2. A method for starting up a reactor, comprising: heating a reactor wall of a reactor from an initial temperature of less than 70° C. to a first temperature of 95° C. to 160° C. by heating an external wall surface of the reactor wall using heat tracing, a pressure in the reactor being 2.0 MPa-g or less during the heating; passing a pressurizing gas flow into the reactor to increase the pressure in the reactor to 2.5 MPa-g or more; and passing a heated gas flow into the reactor to increase the temperature of the reactor wall from the first temperature to a temperature of 200° C. or more.

Embodiment 3. The method of any of the above embodiments, wherein at least a portion of the pressurizing gas flow comprises the heated gas flow.

Embodiment 4. The method of any of the above embodiments, wherein the heat tracing comprises electrical heat tracing, steam heat tracing, or a combination thereof.

Embodiment 5. The method of any of the above embodiments, wherein the heat tracing is inactive during the passing of the heated gas flow into the reactor.

Embodiment 6. The method of any of the above embodiments, wherein a supplemental gas flow is passed into the reactor during the heating of the reactor wall using the heat tracing, the supplemental gas flow comprising a temperature greater than the initial temperature.

Embodiment 7. The method of any of the above embodiments, wherein the external wall surface is heated to a second temperature that is greater than the first temperature by 10° C. to 50° C., the second temperature optionally being 105° C. to 200° C.

Embodiment 8. The method of any of the above embodiments, wherein the reactor wall comprises a thickness of 2.5 cm or more.

Embodiment 9. The method of any of the above embodiments, wherein the heating using the heat tracing is performed for 5 hours or less.

Embodiment 10. The method of any of the above embodiments, wherein the reactor comprises a hydroprocessing reactor.

Embodiment 11. The method of any of the above embodiments, wherein passing the pressurized gas flow into the reactor increases the pressure to 3.4 MPa-g or more, or wherein passing the heated gas flow into the reactor increases the temperature of the reactor wall to 250° C. or more, or a combination thereof.

Embodiment 12. The method of any of the above embodiments, further comprising exposing a feedstock to a pressure of 2.0 MPa-g or more and a temperature of 250° C. or more in the presence of H₂ in the reactor to form a hydroprocessed product.

Embodiment 13. The method of any of the above embodiments, wherein the reactor wall comprises a reactor wall that has previously been exposed to a partial pressure of H₂ at a temperature of 250° C. or more and a pressure of 2.0 MPa-g or more.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for starting up a reactor, comprising:
heating a reactor wall of a reactor from an initial temperature of less than 70° C. to a first temperature of 95° C. or more by heating an external wall surface of the reactor wall using heat tracing, a pressure in the reactor being 2.0 MPa-g or less during the heating;
passing a pressurizing gas flow into the reactor to increase the pressure in the reactor by 0.5 MPa or more; and
passing a heated gas flow into the reactor to increase the temperature of the reactor wall by 50° C. or more relative to the first temperature.

2. The method of claim 1, wherein at least a portion of the pressurizing gas flow comprises the heated gas flow.

3. The method of claim 1, wherein the heat tracing comprises electrical heat tracing, steam heat tracing, or a combination thereof.

4. The method of claim 1, wherein the heat tracing is inactive during the passing of the heated gas flow into the reactor.

5. The method of claim 1, wherein a supplemental gas flow is passed into the reactor during the heating of the reactor wall using the heat tracing, the supplemental gas flow comprising a temperature greater than the initial temperature.

6. The method of claim 1, wherein the external wall surface is heated to a second temperature that is greater than the first temperature by 10° C. to 50° C.

7. The method of claim 1, wherein the reactor wall comprises a thickness of 2.5 cm or more.

8. The method of claim 1, wherein the heating using the heat tracing is performed for 5 hours or less.

9. The method of claim 1, wherein the reactor comprises a hydroprocessing reactor.

10. The method of claim 1, wherein passing the pressurized gas flow into the reactor increases the pressure to 3.4 MPa-g or more, or wherein passing the heated gas flow into the reactor increases the temperature of the reactor wall to 250° C. or more, or a combination thereof.

11. The method of claim 1, further comprising exposing a feedstock to a pressure of 2.0 MPa-g or more and a temperature of 250° C. or more in the presence of H₂ in the reactor to form a hydroprocessed product.

12. The method of claim 1, wherein the reactor wall comprises a reactor wall that has previously been exposed to a partial pressure of H₂ at a temperature of 250° C. or more and a pressure of 2.0 MPa-g or more.

13. A method for starting up a reactor, comprising:
heating a reactor wall of a reactor from an initial temperature of less than 70° C. to a first temperature of 95° C. to 160° C. by heating an external wall surface of the reactor wall using heat tracing, a pressure in the reactor being 2.0 MPa-g or less during the heating;
passing a pressurizing gas flow into the reactor to increase the pressure in the reactor to 2.5 MPa-g or more; and
passing a heated gas flow into the reactor to increase the temperature of the reactor wall from the first temperature to a temperature of 200° C. or more.

14. The method of claim 13, wherein at least a portion of the pressurizing gas flow comprises the heated gas flow.

15. The method of claim 13, wherein the heat tracing comprises electrical heat tracing, steam heat tracing, or a combination thereof.

16. The method of claim 13, wherein the heat tracing is inactive during the passing of the heated gas flow into the reactor, or wherein a supplemental gas flow is passed into the reactor during the heating of the reactor wall using the heat tracing, the supplemental gas flow comprising a temperature greater than the initial temperature.

17. The method of claim 13, wherein the external wall surface is heated to a second temperature that is greater than the first temperature by 10° C. to 50° C., and wherein the second temperature is 105° C. to 200° C.

18. The method of claim 13, wherein the reactor wall comprises a thickness of 2.5 cm or more.

19. The method of claim 13, wherein the heating using the heat tracing is performed for 5 hours or less.

20. The method of claim 13, wherein the reactor comprises a hydroprocessing reactor, the method further comprising exposing a feedstock to a pressure of 2.0 MPa-g or more and a temperature of 250° C. or more in the presence of H₂ in the reactor to form a hydroprocessed product.

* * * * *